May 12, 1942.  E. R. BARNARD  2,282,599
DIESEL ENGINE LUBRICATION
Filed Nov. 17, 1937
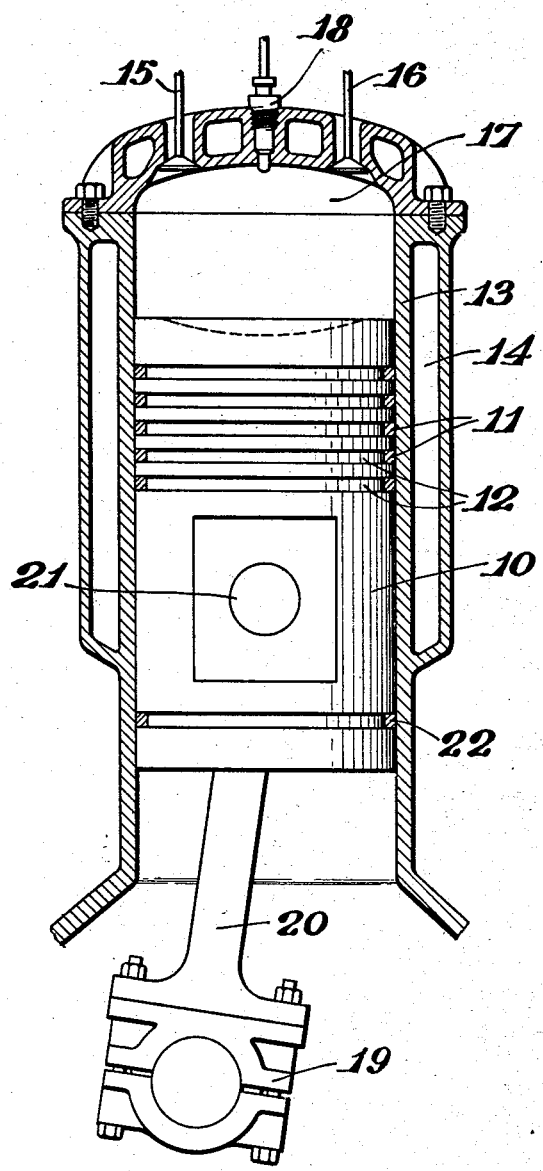
INVENTOR
Edward R. Barnard
BY
Vanderveer VoorRees
ATTORNEY Patented May 12, 1942

2,282,599

UNITED STATES PATENT OFFICE 2,282,599

DIESEL ENGINE LUBRICATION

Edward R. Barnard, Chicago, Ill., assignor to Standard Oil Company, Chicago, Ill., a corporation of Indiana Application November 17, 1937, Serial No. 175,156

5 Claims. (Cl. 184—6)

This invention relates to the lubrication of internal combustion engines and more particularly internal combustion engines of the compression ignition type commonly known as Diesel engines. One object of the invention is to provide a method of lubricating Diesel engines by employing a lubricant which will satisfy the requirements for lubricating the piston and other moving parts of the engine and at the same time will produce little or no carbon deposits on the piston and piston rings which are exposed to high temperature. Another object of the invention is to provide a lubricant of higher viscosity than previously used which will more perfectly seal the piston in the cylinder of the engine, thus reducing the extent of "blow by" and enabling the engine to operate more efficiently, especially at low speeds and under low load conditions. Still another object of the invention is to permit operating compression-ignition engines with higher compression ratios, higher loads and corresponding higher piston temperatures without serious deposition of coke in the piston rings and on the piston which would otherwise jam the piston rings and cause the pistons to seize and score the cylinder walls. Still another object of the invention is to provide a method of lubricating Diesel engines of the high speed type operating at 700 to 2400 R. P. M. Other objects of the invention will be observed from the following description.

The principal characteristic of compression-ignition engines which differentiates them from other internal combustion engines is the use of high compression sufficient to heat the air in the cylinder adiabatically to a temperature above the ignition point of the fuel. In order to accomplish this it is necessary in these engines to employ compression rations of 10 to 1 and higher, even as high as 20 to 1, although in ordinary practice compression ratios of between 12 to 1 and 14 to 1 are used. With compression ratios of this magnitude the compression pressure developed is commonly about 500 pounds per square inch, although pressures of 375 to 400 pounds per square inch may be employed in engines of large size. Pressures of 800-900 pounds per square inch have been employed experimentally, but cannot be used in practice because of mechanical difficulties and particularly because of lubrication failure hereinafter more fully described.

When employing such high cylinder pressures it is impracticable to introduce the entire fuel charge at one time because the combustion pressure developed would exceed the strength of the engine parts and also produce severe detonation. Therefore in Diesel engines the fuel is injected gradually, extending over a considerable portion of the power stroke with a view to maintaining a relatively constant pressure during combustion. As a result of the combustion being extended over a considerable period, the absorption of heat by the piston is much greater than in ordinary internal combustion engines and serious difficulty has been encountered in maintaining a proper lubrication of the piston and piston rings. Piston temperatures behind the top ring have been measured as high as 500° F., a temperature sufficiently high to produce coking of ordinary lubricating oils. The problem is even more severe in the case of two cycle engines than with four cycle engines because of the shorter time allowed between combustion periods for cooling of the piston.

Numerous methods have been tried for preventing carbonization of Diesel engine pistons by decomposition of the lubricating oil. It is common practice, for example, to place the top ring or compression ring an appreciable distance from the top of the piston. Another device is to employ exceptionally long pistons, for example a piston length of one and a half times the diameter, in order to provide greater area of contact with the cooled cylinder walls, thus assisting in dissipating the heat. Still another method is to provide a deep groove in the piston above the top compression ring so that flow of heat from piston crown to rings is retarded by the thinner section of metal. Such grooves are called "heat grooves" or "heat traps." The piston crown thus runs at very high temperatures to which the oil is exposed on the under side, making necessary great resistance to carbon formation.

A larger number of rings is customarily employed on Diesel pistons thas is used in ordinary internal combustion engines in order to provide better contact with the cylinder wall for conduction of heat; also to provide substitute rings to maintain compression in case the top compression ring becomes jammed with carbon and thereby rendered inoperative. In Diesel practice, for example, it is common practice to employ five or six rings on the piston, whereas in ordinary gas engine practice three rings usually are sufficient. Devices for cooling Diesel pistons are commonly employed and are quite essential in the larger engines having pistons of ten inches in diameter or more, in which case oil streams may be directed against the piston or water may be circulated through passages in the piston, employing telescoping pipe connections for the purpose. Such devices, however, are impractical in the smaller high speed type engines which are the principal subject of this invention.

Perhaps the most important means which has been adopted for avoiding carbonization of Diesel engine pistons is the selection of the lubricating oil employed therefor. Heretofore it has been general practice to employ oils of the naphthenic or coastal type in the lubrication of Diesel engines rather than the paraffinic oils. In fact, Pennsylvania oils have been generally avoided for Diesel engine lubrication although they have commanded a premium for the lubrication of other internal combustion engines. The choice of naphthenic oils has been based largely on the fact that they produce less carbon around the piston rings. Various theories have been advanced to account for this, the most plausible explanation being that the naphthenic oils have a higher vapor pressure for a given viscosity and therefore distil away from hot surfaces sufficiently rapidly to prevent serious carbonization. Volatility considerations have also prompted the use of relatively light oils in comparison with the oils used for other internal combustion engines. Thus in the lubrication of Diesel engines of the high speed type oils of 20 and 30 S. A. E. grade are commonly used rather than the heavier oils of 40 and 50 S. A. E. grades whose volatility is considerably less.

Now it is well understood that for the lubrication of engine parts operating at high temperatures such as Diesel engine pistons the most desirable oil would ordinarily be an oil suffering the least change in viscosity with increase in temperature and therefore, measured by this criterion, the naphthenic or coastal oils having very low viscosity indices, for example 0 to 20 Dean and Davis, would ordinarily be avoided. However, the higher volatility of these naphthenic oils is such an important factor in Diesel engine operation that their use is commonly required in spite of their low viscosity index. Attempts to employ oils of higher viscosity index for high speed Diesel lubrication have generally failed because of the low volatility which characterizes such oils, resulting in deposition of hard carbon on the piston rings and in the ring grooves, thus requiring frequent shutting down of the engine for cleaning and overhauling. Inasmuch as Diesel engines find their most important use in installations requiring continuous operation, such as in electric power plants, long distance trucking and bus service, tractor and marine duty, etc., it is especially inconvenient and costly to shut them down for overhauling and therefore every effort has been made by Diesel engine manufacturers and operators to avoid doing so.

The accompanying drawing which forms a part of this specification shows a cross sectional view of a typical four-stroke-cycle engine cylinder and piston with exhaust, inlet valve and fuel injector. The piston 10 is usually constructed of slightly smaller diameter at the top to allow for thermal expansion. The piston is also reduced in diameter above the top ring in order to provide more space for carbon deposition, thus somewhat lengthening the periods between necessary dismantling and cleaning. The rings 11 located in the ring grooves 12 must be carefully fitted to prevent loss of air during compression which is particularly serious in compression-ignition engines. The cylinder wall 13 is cooled by water cooling jacket 14.

After the combustion of the fuel, during the power stroke, exhaust valve 15 is opened to discharge the burning gases, following which inlet valve 16 opens to admit air, the exhaust valve having closed. The cylinder is filled with air, the inlet valve closes and the upward movement of the piston then compresses the air in the compression space 17 to a pressure of about 500 pounds per square inch. The compression is sufficient to heat the air to a temperature above the ignition point of the fuel, for example about 700° F. Just as the piston approaches top dead center, the fuel is injected through the fuel nozzle 18. The fuel for a high speed type Diesel engine is usually a distillate having approximately the characteristics of kerosene or gas oil. Various types of fuel injectors may be employed but a type which is most commonly used in high speed Diesel operation is the so-called solid injection type in which the fuel is forced under high pressure, about 1500 pounds per square inch, to the nozzle 18 where it is sprayed into the heated air, burning instantly during the injection. The combustion of the fuel raises and sustains the pressure in the combustion space 17 during the power stroke of the piston, after which the burned gases are exhausted again and the cycle repeated.

Part of the heat of the burning gases is transmitted to the cylinder head and cylinder walls where it is removed by suitable water jacketing as indicated. The heat which is absorbed by the piston head, however, must necessarily be dissipated by conduction downward through the body of the piston and outward into the cylinder walls where the piston comes in contact therewith. The upper or compression rings of the piston therefore operate at a much higher temperature than the lower rings and accordingly are the ones which are the first to become carbonized by decomposition of the lubricating oil which reaches them from the cylinder walls below the piston. Lubricating oil is usually applied to the piston by forcing it through the crank shaft (not shown) and out through the connecting rod crank bearing 19 or it may be conducted through connecting rod 20 and allowed to flow through suitable channels from the wrist pin bearing 21. Excess oil applied to the cylinder walls in this way when the piston is in the upper position is wiped from the cylinder walls by oil ring 22 which leaves a uniform film of oil on the cylinder walls for lubrication of the upper part of the piston and the upper rings. The oil which reaches the compression rings in this manner therefore serves not only to provide an oil film on the cylinder walls to prevent metal contact between the piston rings and the cylinder walls which would rapidly result in scoring the cylinder, but also serves to seal the piston rings in the grooves 12, thus assisting in maintaining the desired compression in the cylinder.

A careful study has been made of the carbonization of lubricating oils in internal combustion engines and some of this work has been published in S. A. E. Journal, vol. 29, 1931 (p. 215) by W. H. Bahlke, et al. This work which was conducted with various oils, both natural and synthetic, showed that the carbon forming tendency of the oil was substantially in inverse proportion to the volatility. Accordingly a volatility test has been devised and has proved to be an accurate index of the carbon forming tendency of oils in internal combustion engine service. This test is called the "carbonization index" and is performed by distilling a 100 gram sample of the oil at 1 mm. mercury pressure and determining the temperature of the vapor when 90% has distilled over.

I have now discovered that a synthetic oil made by the polymerization of isobutylene exhibits unusual properties which render it peculiarly adapted for the lubrication of Diesel engine pistons. This synthetic oil hereinafter called isobutylene Diesel oil, is made by subjecting liquid isobutylene or hydrocarbon mixtures containing it to the action of boron fluoride at ordinary temperatures, for example temperatures of about 0° F. to 100° F. The resulting polymerization product is carefully distilled to remove from it the excessively light and heavy polymerization products which are unsatisfactory.

I have found that the synthetic oil produced in this manner possesses far less tendency to form carbon than would be indicated by the carbonization index. Tests were conducted in a Diesel engine employing several oils with results as shown in the following table:

|  | Paraffin base oil | Naphthene base oil | Synthetic oil from wax | Synthetic oil from isobutylene |
|---|---|---|---|---|
| Flash point____0° F____ | 470 | 395 | 420 | 375 |
| Gravity A. P. I.____ | 28.1 | 21.6 | 30.8 | 32.2 |
| Viscosity seconds at at 210° F____ | 69.6 | 56.2 | 68.2 | 67.3 |
| Viscosity index____ | 103 | 24 | 97 | 91 |
| Carbonization index____ | 800 | 467 | 600 | 550 |
| Carbon, actual formation in 100 hr. engine test (per piston) grams__ | *3.7 | *1.5 | *0.5 | *Nil |
| Hours required to stick rings____ | 50–75 | 800 | †1,000 | †2,000 |

*Does not include deposits on underside of piston crown and inside piston skirt.
†Estimated.

It will be observed that the above four typical oils all have the same viscosity at 210° F. except the naphthene base oil which has about the same viscosity as the paraffin base oil at 100° F. It will also be noted from the above results that with the exception of the isobutylene Diesel oil, the carbonization index bears a close relation to the carbon actually formed in the test engine, whereas the isobutylene Diesel oil produced much less carbon than would be expected. It should further be noted that the viscosity index of the isobutylene Diesel oil is nearly as high as that of the Pennsylvania oil, whereas the Pennsylvania oil produced a great deal more carbon in the engine test. The time required to stick rings depends largely on the amount of carbon formed.

As previously indicated, my isobutylene Diesel oil is made by polymerizing liquid isobutylene with boron fluoride. In carrying out this part of the process, liquid isobutylene is maintained under pressure and cooled to a temperature, for example, of about 0° C., and about 0.1% to 2% of BF₃ is added with vigorous agitation. Excessive rise in temperature due to the heat of reaction may be avoided by efficient cooling. In order to facilitate agitation in handling and to assist in controlling the reaction I prefer to employ a diluent such as hexane, liquid butane, propane, naphtha, etc., using a solution containing about 20% of isobutylene. I may also employ the butane-butylene fraction recovered from petroleum gases, especially those gases produced in the cracking of petroleum oils for the manufacture of gasoline. This light fraction may contain about 10% to 25% of isobutylene, the remainder being principally butanes and normal butylene.

It is preferred to subject the isobutylene to the action of the BF₃ catalyst for about 30 minutes and thereafter recover the heavy oily product by neutralization of the excess catalyst and removal of unreacted light hydrocarbons by evaporation. The resulting product is a viscous oil, a typical sample of which has the following characteristics:

Viscosity at 100° F. _____seconds__ 1538
Viscosity at 210° F. _____do___ 117
Viscosity index, about_____ 101
Flash _____°F__ 250
Pour point _____do___ −35

This oil, although satisfactory for many lubrication problems, was found to be quite unsatisfactory for the lubrication of Diesel engines. A 25 hour test conducted with the oil was terminated because of an increase in viscosity of the oil of about sevenfold. No appreciable oxidation or sludging was observed in the test although the crankcase temperature was about 300° F. It is believed that the large increase in viscosity was due partly to evaporation and partly to a chemical change of the high boiling constituents of the product since it is well known that the polymerization of isobutylene and its lighter polymers, when heated, produces some products having an extremely high molecular weight of the order of 2,000 to 5,000, or even higher.

Since the isobutylene polymerization product was found to be unsatisfactory as shown by the above test, an effort was made to correct the difficulty by removing both the low boiling and the high molecular weight constituents by fractional distillation. Distillation was carried out under vacuum and an oil having the following characteristics was obtained:

Viscosity at 100° F_____seconds__ 600
Viscosity at 210° F_____do____ 67.3
Viscosity index_____ 91.0
Flash point_____ 375
Pour point _____°F__ 375
A. P. I. gravity_____do__ −35
Carbonization index, about_____ 32.0
_____ *550

*Thermal decomposition began at 85% off and 533° F.

This oil was tested in a single cylinder, tractor type Diesel engine which was operated under full rate at 850 R. P. M. for a period of 750 hours, the oil being changed after each 60 hour period as recommended in service and new oil being added from time to time to make up for normal consumption, about 3 pints in 60 hrs. Oil samples for inspection purposes were taken each 30 hrs. The results of this test were unprecedented, especially with respect to the small amount of carbon deposited on the engine piston and rings. An examination of the engine after 100 hrs., 250 hrs., 500 hrs., and 750 hrs. showed no stuck rings and the deposition of only about 1.1 grams of carbon on the entire outside surface of the piston, whereas a similar test conducted with a typical Diesel oil manufactured from Humble crude petroleum produced 7.3 grams of carbon.

I have found that for satisfactory Diesel operation, it is desirable to fractionate the synthetic isobutylene polymer and select a fraction having about 70% to 85% distilled at 500° F. column temperature at 1 mm. pressure, with a carbonization index of between 450° F. and 625° F., for example 500–575° F. It is also desirable that the Saybolt viscosity be about 550 seconds to 850 seconds at 100° F. and about 55 seconds to 75 seconds at 210° F. Somewhat higher viscosities than this may be employed but if the viscosity is too high a loss of power results from lubricating oil friction. However, the extremely low carbon-forming tendency of the isobutylene Diesel oil makes it possible to employ oils having viscosities as high as 1400 Saybolt at 100° F., corresponding to about 100 Saybolt at 210° F. In general, I prefer to employ oils having a viscosity within the range of S. A. E. 30–40, although for some types of service I may use isobutylene polymer fractions of narrow boiling range as light as S. A. E. 20 and as heavy as S. A. E. 50.

In the case of certain types of severe engine operation I have observed a phenomenon known as "feathering" of the piston rings and I have discovered that this may be prevented by incorporating in the oil small proportions of certain compounds of oxygen, sulfur, phosphorus or chlorine. For example, I may add to the Diesel oil from .01% to 0.2% of organic sulfur compounds such as oil soluble disulfides, lead oleate, ethyl chlor stearate or calcium phenyl stearate, aluminum naphthenate or organic phosphites such as tributyl and triamyl phosphite, etc. I have found that free sulfur is especially effective in concentrations between .002% and 0.2%. I prefer to dissolve the sulfur in a portion of the oil by heating to an elevated temperature and add the desired amount of the resulting solution to the remainder of the Diesel oil. I may also dissolve the sulfur in other mineral oils or fats and add the resulting solution to the isobutylene Diesel lubricating oil. Comparative tests made on a Diesel engine under severe operating conditions showed a pronounced "feathering" of the piston rings in twenty-four hours operation where the straight isobutylene Diesel oil was used, whereas under the same conditions, using the same oil containing .01% of sulfur, after forty-eight hours operation substantially no "feathering" of the piston rings was observable. To prevent this undesirable "feathering" effect I prefer to employ sulfur in the amount of .01% to 0.1%, at which concentration the sulfur imparts substantially no undesirable corrosive properties to the oil.

Having thus described my invention, what I claim is:

1. The method of preventing the "feathering" of piston rings in high speed Diesel engines operating under high load conditions at compression pressures of 500 to 800 pounds per square inch while said piston rings are coated with a film of synthetic hydrocarbon lubricating oil having a viscosity in the range of 20 S. A. E. to 50 S. A. E. motor oils produced by the catalytic polymerization of liquid isobutylene at a temperature between 0° F. and 100° F., comprising dissolving in said lubricating oil .001% to 0.2% of a substance selected from the class consisting of the oil soluble compounds of oxygen, sulfur, phosphorus and chlorine.

2. The method of preventing the "feathering" of piston rings in high speed Diesel engines operating under high load conditions at compression pressures of 500 to 800 pounds per square inch while said piston rings are coated with a film of synthetic hydrocarbon lubricating oil having a viscosity in the range of 20 S. A. E. to 50 S. A. E. motor oils produced by the catalytic polymerization of liquid isobutylene at a temperature between 0° F. and 100° F., comprising dissolving in said lubricating oil from .001% to 0.1% of sulfur.

3. The method of preventing the "feathering" of piston rings in high speed Diesel engines operating under high load conditions at compression pressures of at least about 375 pounds per square inch, while said piston rings are coated with a film of a lubricant comprising predominantly a synthetic hydrocarbon oil resulting from the polymerization of liquid isobutylene by the catalytic action of boron fluoride at a temperature between about 0° F. and 100° F., comprising dissolving in said lubricant from about .001% to about 0.2% of a substance selected from the class consisting of oil-soluble compounds of oxygen, sulfur, phosphorus and chlorine.

4. The method of preventing the "feathering" of piston rings in high speed Diesel engines operating under high load conditions at compression pressures of at least about 375 pounds per square inch, while said piston rings are coated with a film of a lubricant comprising predominantly a synthetic hydrocarbon oil resulting from the polymerization of liquid isobutylene by the catalytic action of boron fluoride at a temperature between about 0° F. and 100° F., comprising dissolving in said lubricant about 0.001% to about 0.2% of an organic phosphite.

5. The method of preventing the "feathering" of piston rings in high speed Diesel engines operating under high load conditions at compression pressures of at least about 375 pounds per square inch, while said piston rings are coated with a film of a lubricant comprising predominantly a synthetic hydrocarbon oil resulting from the polymerization of liquid isobutylene by the catalytic action of boron fluoride at a temperature between about 0° F. and 100° F., comprising dissolving in said lubricant about 0.001% to about 0.2% of a chlorine-containing organic compound.

EDWARD R. BARNARD.